Oct. 17, 1939.　　　　O. WITTEL　　　　2,176,517
FILM SPROCKET
Filed March 4, 1937
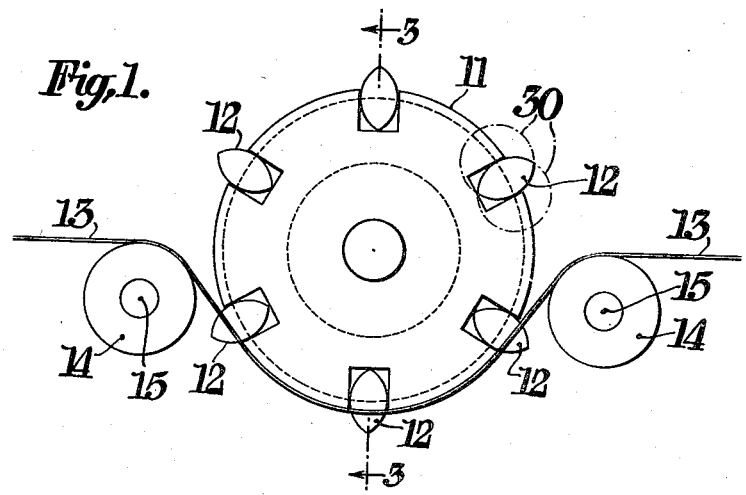
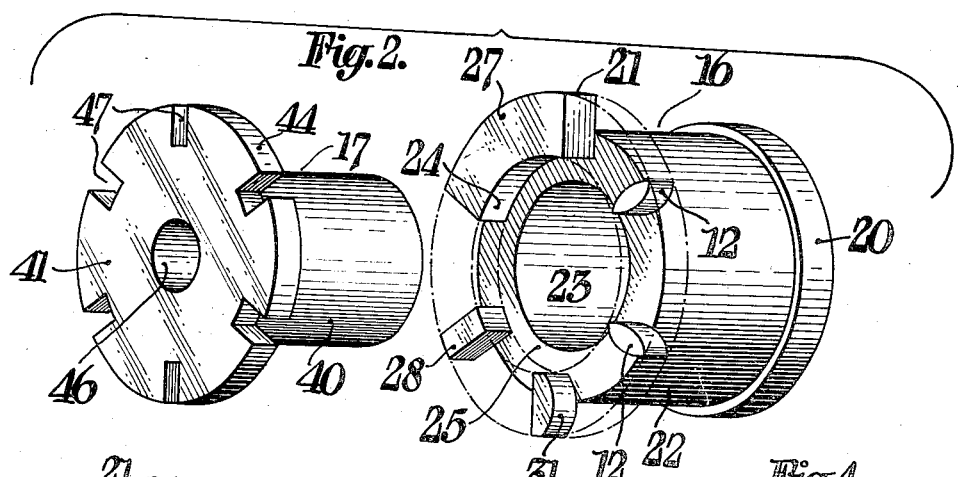
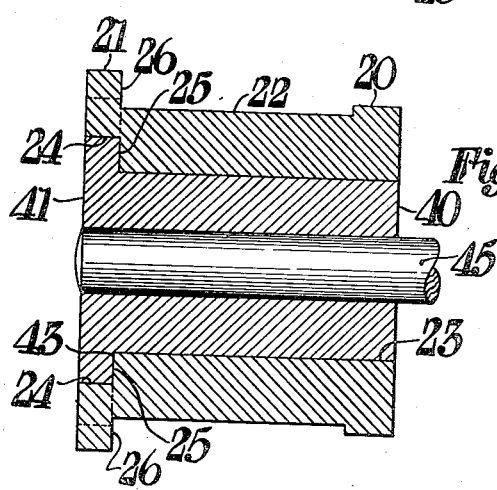
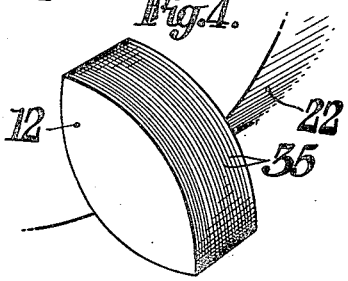
Otto Wittel
INVENTOR
BY Newton M. Perruis
　　Donald H. Stewart
ATTORNEYS.

Patented Oct. 17, 1939

2,176,517

UNITED STATES PATENT OFFICE 2,176,517

FILM SPROCKET

Otto Wittel, Rochester, N. Y., assignor to Eastman Kodak Company, Rochester, N. Y., a corporation of New Jersey Application March 4, 1937, Serial No. 129,086

9 Claims. (Cl. 74—243)

This invention relates, in general, to sprocket wheels, and more particularly to sprocket wheels for moving a strip of film through a motion picture machine.

In motion picture machines, it is the usual practice to move the film through the machine by means of a number of sprockets. These sprockets are provided with spaced teeth which are arranged to engage marginal perforations of the film strip. As the films are usually made of a cellulose nitrate or acetate or some similar material, they are subject to breakage or tearing particularly in the area of the marginal perforations.

The sprockets are usually made from suitable solid stock the surface of which is machined or otherwise finished to form spaced teeth of the proper contour. In forming such teeth, the successive cuts of the cutting tool are made across or axially of the teeth. Such cuts form minute ridges or marks which extend across the tooth or in a direction substantially normal to the feeding of the film strip onto and stripping it off from the sprocket teeth. Such marks not only cause poor stripping of the film, but also readily wear the edges of the film perforations, thus causing the film strip to split or break adjacent thereto. The minute ridges or serrations may in extreme cases tend to abrade the film, thus quickly damaging the film.

The present invention overcomes this difficulty by providing a film sprocket, the teeth of which are so formed that any tool or cutter marks are radially of the teeth. By means of this arrangement, any cutter marks are in the direction of film stripping, and thus not only facilitate such stripping, but also greatly reduces wear of the film strip adjacent the marginal perforations.

The principal object of the invention is the provision of a film sprocket the teeth of which are so formed that any cutter marks are in the direction of the film stripping.

A further object of the invention is the provision of such a sprocket the teeth of which may be formed accurately and of the proper contour.

A still further object of the invention is the provision of a sprocket of this kind which may be so formed that the outer surfaces thereof can be made accurately, and concentric with the supporting shaft.

Another object of the invention is the provision of a film sprocket which is simple in construction, relatively inexpensive to manufacture, accurately formed, and highly effective in use.

To these and other ends, the invention resides in certain improvements and combinations of parts, all as will be hereinafter more fully described, the novel features being pointed out in the claims at the end of the specification.

In the drawing:

Fig. 1 is a side elevation view of a film sprocket constructed in accordance with the preferred embodiments of the invention, showing the manner in which the sprocket moves the film strip through a motion picture machine.

Fig. 2 is a perspective view of the sprocket parts constructed in accordance with the present invention, the parts being separated for the sake of clearness.

Fig. 3 is a vertical sectional view taken substantially on the line 3—3 of Fig. 1, showing the arrangement of the various parts of the assembled sprocket.

Fig. 4 is an enlarged perspective view of one of the sprocket teeth, showing the direction of the cutter marks. These marks are enlarged and exaggerated for purposes of illustration.

The same reference numerals throughout the several views indicate the same parts.

The invention is embodied in the present instance, by way of illustration, in a sprocket adapted to move a film strip through a motion picture machine. It is contemplated, however, that such a sprocket is adapted to a wide variety of uses. The preferred form of sprocket comprises, in general, a hollow cylindrical outer member or blank formed with a concentric central opening extending axially therethrough. The outer cylindrical surface is formed with a peripheral marginal ridge, at one end thereof, which is adapted to support one edge of a film strip. A plurality of film engaging teeth project axially from the opposite end of the blank. These teeth have lower portions which extend below the surface of the blank, and film engaging portions which project above the blank surface and engage the marginal perforations adjacent the opposite edge of the film strip.

A cylindrical tubular or sleeve member fits tightly within the central opening formed in the blank. This sleeve member is formed with a concentric central opening to receive a supporting and driving shaft. One end of this sleeve is formed with a disk which extends radially from the sleeve and overlies the end of the blank from which the teeth project. This disk has a plurality of open end notches cut in the periphery thereof to receive the lower portions of the teeth to protect the latter and to afford some measure of support therefor. The rim of this disk is formed concentric with the supporting shaft and projects slightly above the surface of the blank to provide a marginal ridge which supports the edge of the film adjacent the marginal perforations thereof. The teeth thus move the film strip through the machine while the marginal peripheral ridge formed on the blank cooperates with the rim of the disk to support the strip at the edges thereof, the picture area of the strip being slightly spaced from the sprocket, as is well known.

Referring now to Fig. 1, the numeral 11 designates broadly a film sprocket constructed in accordance with the preferred embodiments of the invention. This sprocket 11 has a plurality of spaced teeth 12, hereinafter more fully described, which are arranged to extend through marginal perforations, not shown, in a film strip 13 to move the latter through a motion picture machine, in a manner well known to those in the art. The strip 13 is guided over the idler rollers 14 arranged on opposite sides of the sprocket 11. These rollers 14 are mounted to rotate freely on the shafts 15 which may be mounted, in any suitable manner, in the machine housing, not shown.

The sprocket 11 comprises, in general, an outer cylindrical member or blank, and an inner cylindrical sleeve member which are broadly designated by the numerals 16 and 17 respectively. The sprocket shown in the present embodiment is of the type used for 16 mm. sound film and has the teeth 12 thereof arranged only on one side to engage single perforated film, as is well known. Such a sprocket is, however, by way of illustration only, as it is contemplated that a double row of teeth may be formed so that the sprocket may be used for double perforated film. The members 16 and 17 may be formed in a number of ways well known to those in the art, and the applicant does not, therefore, limit himself to any specific way of forming these parts and intends to cover all variations and modifications that fall within the spirit of the invention and the scope of the appended claims.

The blank 16 is preferably, although not necessarily, formed from a length of cylindrical rod of suitable material, preferably metal, which is machined to provide marginal peripheral flanges 20 and 21, and a cylindrical recessed portion 22 extending between the flanges 20 and 21, as clearly illustrated in Figs. 2 and 3. The flange 21 is preferably made higher than flange 20, as shown in Figs. 2 and 3, for reasons to be later described. A central opening 23 is then formed axially through the blank 16, concentric with the flanges 20 and 21 and the recessed portion 22. It is highly important for satisfactory operation that this central opening 23 be concentric with flanges 20 and 21 and the recessed portion 22, as will be apparent to those familiar with the art.

After the hole 23 is thus formed, it is then counter-bored as shown at 24, the bottom 25 of the counter-bored portion being substantially in the plane of the inner edge 26 of the flange 21 to form therewith an annular ring, a portion of which is shown in 27, Fig. 2, the balance of the original ring being illustrated in broken lines. The above operations may, for example, be performed on a screw machine to bring the blank down to its approximate dimensions. The blank may then be finished on a lathe.

The next operation is to remove portions of the annular ring to form a plurality of spaced peripheral lugs, one of which is shown at 28, Fig. 2.

The material between the lugs 28 may be removed, for example, by means of a milling cutter. If, for example, the sprocket is provided with an even number of teeth, two opposite sections of the annular ring may be cut out at the same time so as to form two opposite lugs 28. Furthermore, the material on the opposite sides of each lug, or on opposite lugs, may be cut out in one operation by mounting two cutters on a single arbor. As all these operations are well known to those familiar with machine shop practice, it is believed that the above description is sufficient.

The spaced lugs 28 are then machined to form the spaced teeth 12, which project axially from one end of the blank 16, as shown in Fig. 2. This machining operation is preferably performed by means of a hollow mill which is diagrammatically illustrated at 30, Fig. 1. This hollow mill is moved axially toward the blank to cut or form one face 31 of a lug 28, as illustrated in Fig. 2. The mill is then moved to a position to cut or form the opposite face of the lug, as shown in broken line, Fig. 1.

By means of a hollow mill the opposite faces of the teeth 12 are accurately formed to the proper shape. While the mill 30 is moved axially toward the blank 16 during the forming of the teeth 12, the various successive cuts are made axially of the teeth, as will be apparent to those familiar with machine shop practice, so that the cutter marks extend axially of the teeth or in the direction of the film stripping, as shown, greatly exaggerated, at 35, Fig. 4. The marks shown in Fig. 2 are shading marks and are not intended to represent the cutter marks.

It is apparent, therefore, that any such cutter marks afford finely spaced minute ridges or tracks which facilitate the feeding of the strip 13 onto and stripping it off the teeth 12. Such cutter marks also eliminate, or at least greatly reduce, the tendency of the strip 13 to break or tear adjacent the perforations as is the case of teeth formed in the usual manner. It is apparent, however, that these marks will be extremely fine, and in some cases even microscopic, depending on the skill of the workman and the sharpness of the mill used. The enlarged marks shown in Fig. 4 are for the purpose of illustration only.

The inner member 17 is preferably formed from a piece of metal rod to provide a cylindrical sleeve portion 40, and a laterally extending disk 41 of greater diameter than the sleeve 40. The sleeve 40 tightly fits within the opening 23 of the blank 16, while the disk 41 lies in the counter-bored section 24, the inner face 43 of the disk engaging the bottom 25 of the counter-bored section, as clearly shown in Fig. 3. The cylindrical rim 44 of the disk 41 is accurately machined or finished so that it is the same diameter as the flange 20 with which it cooperates to support the film strip 13 adjacent the edges thereof. A supporting and driving shaft 45 extends through a central opening 46 formed in the member 17, as shown in Fig. 3. By making the member 17 as a separate unit, the rim 44 may be accurately formed to proper size and concentric with the shaft 45. This feature is highly important in sprockets of this type.

The rim 44 of the disk 41 is cut, for example, by a milling cutter to provide a plurality of open-end peripheral notches or slots 47 in which the lower portions of the teeth 12 are recessed. As the disk 41 is substantially the same thickness as the teeth, see Fig. 3, the disk 41 not only affords a substantial protection for the lower portions of the teeth 12, but also provides some measure of support therefor. It will also be noted upon an inspection of Fig. 3 that the various areas of contact of the teeth 12 with the blank 16 lie substantially in a vertical plane, or in the plane of the bottom 25 of the counter-bored portion 24.

It is apparent from the above description that the present invention provides a film sprocket having a plurality of film teeth the cutter marks of which are in the direction of the film stripping. It is also apparent that the various parts of the sprocket may be accurately and concentrically formed so as to insure smooth operation. In addition, the sprocket teeth are accurately formed and of the proper contour.

In referring to the cutter marks in the above specification and in the claims, I wish to point out that these marks are often scarcely visible. They may be eliminated, for example, by buffing or polishing, but this operation is expensive and spoils the exact contour and dimensions of the tooth. The cutter marks may be in the order of .0001" to .0003" in height, in the average case, although the size and shape of such marks necessarily varies widely with the equipment used and the skill of the mechanic. I wish to point out that any departure from the ideal tooth surface is objectionable, and, in all cases, the cutting irregularities which are microscopic in size should be kept as small as possible. In any case, as such marks, from a practical standpoint, cannot be entirely eliminated, the effect of these defects can be substantially eliminated by having them extend in the direction of travel of the film strip onto and off from the tooth.

While only one embodiment of the invention has been disclosed, this is by way of illustration only as it is contemplated that the inventive idea may be carried out in a number of ways. This application is, therefore, not to be limited to the precise details described, but is intended to cover all variations and modifications thereof falling within the spirit of the invention and the scope of the appended claims.

I claim:

1. A film sprocket comprising a cylindrical blank, and a plurality of radially extending film engaging teeth formed from said blank and projecting axially from one end thereof, the connecting surfaces between said blank and said teeth lying substantially in a radial plane.

2. A film sprocket comprising a cylindrical blank, a plurality of radially extending film engaging teeth integral with said blank and projecting axially from one end thereof, said teeth having portions thereof extending radially inwardly from the outer surface of said blank and means associated with said blank for supporting and protecting said portions.

3. A film sprocket comprising a cylindrical blank having a concentric opening extending axially therethrough, a plurality of radially extending film engaging teeth integral with said blank and projecting axially from one end thereof, and an inner sleeve member having a tubular part arranged to extend into said opening and a disk portion on one end thereof arranged to overlie said one end of said blank, said disk portion being formed with a plurality of radial notches formed on the periphery thereof to receive portions of said teeth to support and protect said portions.

4. A film sprocket comprising a cylindrical blank having a central opening extending axially therethrough, a plurality of radially extending teeth projecting axially from one end of said blank, said teeth having portions arranged below the cylindrical surface of said blank and film engaging portions projecting above the cylindrical blank surface, a sleeve member having a tubular part arranged to extend into said opening, and a disk integral with said sleeve member and extending radially therefrom and overlying said one end of said blank, said disk being formed with a plurality of peripheral notches adapted to receive the lower portions of said teeth to support and protect the latter.

5. A film sprocket comprising a cylindrical blank, a plurality of radially extending film engaging teeth formed from one end of said blank and having portions overhanging said one end and extending inwardly toward the center of said blank and below the outer surface thereof, and means for encasing said portions to protect the latter.

6. A film sprocket comprising a cylindrical blank, a plurality of radially extending film engaging teeth adjacent one end of said blank, and a single member for encasing portions of said teeth to protect said portions and for supporting a film strip adjacent one edge thereof.

7. A film sprocket comprising a cylindrical blank having an intermediate recessed portion, a plurality of radially extending film engaging teeth adjacent one end of and formed from said blank, said teeth having portions thereof extending radially inwardly of said recessed portion and connected to said one end along a plane, a peripheral ridge adjacent the opposite end of said blank and arranged to support a film strip adjacent one edge thereof, means including a radially notched disk associated with said blank for protecting said portions, and means adjacent said teeth for supporting a film strip adjacent the other edge thereof.

8. A film sprocket comprising a cylindrical blank, a plurality of radially extending film engaging teeth formed from the material of said blank and projecting axially therefrom, a peripheral ridge adjacent the opposite end of said blank and arranged to support a film strip adjacent one edge thereof, and a single member associated with said blank to encase and protect portions of said teeth and having a part thereof arranged to engage said film strip adjacent the opposite edge thereof and cooperating with said ridge to support said strip.

9. A film sprocket comprising a cylindrical blank a peripheral ridge formed on said blank adjacent one end thereof and arranged to support a film strip adjacent one edge thereof, a plurality of film engaging teeth integral with said blank and projecting axially from the other end thereof, said teeth having lower portions extending below the cylindrical surface of said blank and film engaging portions projecting above said cylindrical surface, a disk overlying said other end and formed with a plurality of peripheral notches in which said lower portions extend to protect the latter, a peripheral rim on said disk projecting above said cylindrical surface to support said film strip adjacent the other edge thereof, and means integral with said disk for securing the latter to said blank.

OTTO WITTEL.